United States Patent
Kawashima

[15] 3,678,274
[45] July 18, 1972

[54] DIAPHRAGM-LESS RADIOACTIVE RADIATION COUNTER

[72] Inventor: Nobuki Kawashima, Tokyo, Japan
[73] Assignee: President of Tokyo University, Tokyo, Japan
[22] Filed: March 20, 1970
[21] Appl. No.: 21,380

[30] Foreign Application Priority Data
Oct. 29, 1969 Japan..............................44/86061

[52] U.S. Cl....................250/83.6 R, 250/83.6 FT, 313/93
[51] Int. Cl. .........................................G01t 1/18, H01j 39/26
[58] Field of Search.................250/83.6 R, 83.6 FT, 43.5 D, 250/43.5 MR; 313/93

[56] References Cited
UNITED STATES PATENTS
2,924,715 2/1960 Hendee et al. ..............250/83.6 FT X
3,226,550 12/1965 Verster et al. .............250/43.5 MR X
2,860,254 11/1958 Hendee..............................313/93 X

*Primary Examiner*—Archie R. Borchelt
*Attorney*—Flynn & Frishauf

[57] ABSTRACT

A radio-active radiation counter is provided with a counter chamber having a diaphragm-less open window, and two collecting electrodes are disposed in said chamber and separated from each other. A gas to be ionized is injected in a pulse into the chamber intermittently to create a gas cloud for a short duration in the space where the electrodes are disposed, and a voltage pulse is applied across the electrodes during the presence of said gas cloud between the electrodes to operate the counter in order to measure the radiation coming into the chamber during the voltage being applied to the electrodes. Because of the absence of a diaphragm in the ray entrance window of the counter chamber, the absorption of radiation energy in a diaphragm is avoided and thereby it is possible to measure radiations of energy less than 1 Kev.

5 Claims, 2 Drawing Figures

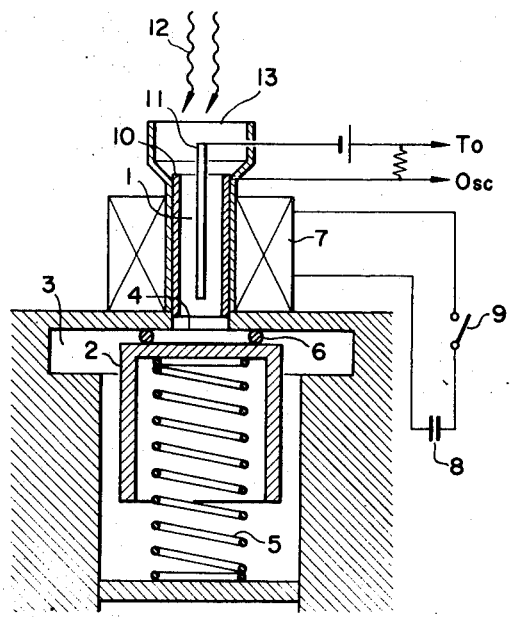

DIAPHRAGM-LESS RADIOACTIVE RADIATION COUNTER

BACKGROUND OF THE INVENTION

This invention relates generally to a counter for measuring radioactive radiations and more specifically to a counter provided with a diaphragm-less window for measuring low energy radioactive radiations.

Counters including a sealed chamber filled with a gas to be ionized, such as Geiger counter, proportional counter etc., have long been used, and they are quite useful as accurate and convenient measuring means used for the experimental research works and practical development of the application of radioactive radiation in the field of, for example, nuclear physics, radio isotope technology, etc.

As the field of research and application of radioactive radiation expands, it has become necessary to develop a radiation counter for low energy radioactive radiations. Especially, as a result of the progress of the space science and technology, many radiation sources such as X-ray stars, pulsars etc. have been discovered in cosmic space, and these radiation sources offer tremendous interesting material to space physicists. Therefore, it is natural to expect that a new phenomena would be discovered in near future in the region of vacuum ultra violet ray and soft X-ray, since these areas have not yet been extensively exploited due to the lack of good detectors for detecting such rays.

Some detectors have already been developed for measuring rays in the vacuum ultra violet region as an extension of the conventional optical spectroscopic methods, but there is scarcely any detector for rays in the soft X-ray region, and especially for soft X-rays of energy less than 1 Kev.

For a soft X-ray of energy range less than 1 Kev, the measurement should be carried out under vacuum conditions by placing both the radiation source and detector in a vacuum, since the soft X-rays tend to absorb into the air. A conventional counter which has been used heretofore in such a case as mentioned above has a gas chamber filled with a gas to be ionized under pressure in a range of 1 — 700 Torr and within which collecting electrodes are disposed, thus the ray entrance window provided in the chamber should be sealed by a diaphragm to support the pressure difference between the inside and outside of the chamber. In this construction of the counter, radiations entering into the chamber through the window are remarkably absorbed in the diaphragm which closes the window, and this is the reason why the measurement of soft X-rays of energy less than 1 Kev is very difficult.

SUMMARY OF THE INVENTION

The general object of this invention is to provide a new radioactive radiation counter suitable for the measurement of soft X-rays and other radioactive radiations of energy less than 1 Kev.

More specifically, the main object of this invention is to provide a radioactive radiation counter wherein the diaphragm is eliminated from the ray entrance window of the counter chamber and a gas to be ionized is injected in a pulse into the chamber intermittently to create a gas cloud for short duration between two collecting electrodes in order to perform effective ray counting operation.

These and other objects of this invention can be attained by providing a counter which comprises a chamber provided with a ray entrance window, two collecting electrodes disposed in said chamber and separated from each other and means to apply a voltage across said electrodes, wherein said window has no closing diaphragm in order to make the inside space of said chamber open to the outside vacuum space, a gas cloud is created for short duration in said chamber by injecting a gas to be ionized intermittently into said chamber in pulse by means of a fast acting gas valve and a pulse voltage is applied to said electrodes during the presence of said gas cloud in the space between said electrodes and thereby the counter is operated to measure radiations coming into said chamber. In the counter according to this invention a gas to be ionized is provided in the chamber of the counter in a pulse, in order to eliminate a diaphragm which closes a ray entrance window of the counter chamber, and thereby to avoid the absorption and loss of radiation energy in the diaphragm. Thus, the counter can work normally as a counter for a certain period of time without a diaphragm at the window of the chamber.

More specifically, in a counter of this invention, a gas is intermittently injected in a pulse into a space between two collecting electrodes disposed in the counter chamber having an open ray entrance window by using a fast-acting gas valve actuated by means of, for instance, an electromagnetic coil, a mechanical hammer etc. and when the gas pressure in the space between the electrodes is built up to a predetermined value a voltage pulse as applied across said electrodes, thereby radiation coming into said chamber through the open window is measured during the time the voltage is applied to the electrodes.

Here, the timing of the application of a voltage pulse should be appropriately chosen so that the gas cloud is just existing in the apace between the electrodes and the gas has not yet diffused so much out of the chamber through the open window, in order to attain an effective operation of the counter and to minimize the absorption and loss of the radiation energy caused by the gas at the outside of the counter chamber.

The foregoing and other novel features of this invention will now be described in detail as applied to an illustrative embodiment, with reference to the accompanying drawing.

BRIEF DESCRIPTION OF THE DRAWING

FIG. 1 is a diagrammatic cross sectional front view of an embodiment of a diaphragm-less radioactive radiation counter according to this invention, and FIG. 2 is a partial view of the counter of FIG. 1 schematically illustrating a mechanical operator for the valve of FIG. 1.

DESCRIPTION OF THE PREFERRED EMBODIMENT

A fast-acting gas valve which controls the supply of a gas to a counter chamber 1 includes a valve member 2 made of light metal such as aluminum etc. This valve member 2 is disposed in a gas plenum 2 which communicates with said counter chamber 1 through an opening 4, and is normally pressed against the valve seat around the opening by a spring 5 supported on one inner wall of the gas plenum 3. The valve member 2 and the valve seat are sealed hermetrically by a vacuum seal gasket 6 interposed therebetween. A gas to be ionized is supplied through a suitable gas inlet (not shown) and stored in the gas plenum 3 at pressure higher than the gas pressure desired in the counter chamber for the operation of the counter. When the valve member 2 is actuated intermittently at a high speed, the gas plenum 3 communicates with the counter chamber 1 though the opening 4, and the gas stored in the plenum is ejected into the chamber 1 and an appropriate gas density distribution is created in the chamber.

The valve member 2 is actuated by the excitation of an electromagnetic coil 7 mounted outside of the plenum 3 around the counter chamber 1. The electromagnetic coil 7 is excited instantaneously by the discharge of a capacitor 8 through a suitable switch 9 such as a thyratron. When the capacitor 8 has a capacity of 200 $\mu$F and is charged to a terminal voltage of 1,500 V and the inductance of the electromagnetic coil 7 is 100 $\mu$H, a half period of the discharge of the capacitor 8 is about 200 $\mu$S. In response to the excitation of the electromagnetic coil 7 by such a discharge of the capacitor 8 as mentioned above the valve member 2 is expelled downward in the drawing at a high speed of more than 10 m/sec. The time required for the opening of a gap of 1 mm between the valve member 2 and the valve seat is about 100 $\mu$S, and the gas stored in the plenum 3 is ejected in a pulse through the opened gap and the opening 4 into the counter chamber 1. When the gas pressure in the counter chamber 1 is built up to a predetermined value a voltage pulse is applied across two electrodes 10 and 11 disposed in the counter chamber 1 to operate the counter and the radiation 12 coming into the chamber through an open window 13 of the chamber during the voltage being applied to the electrodes is counted by the conventional method.

It is noted that the timing of the application of a pulse voltage to the electrodes 10 and 11 should be appropriately chosen so that the gas cloud is just existing in the space between the electrodes and the gas has not diffused so much out of the counter chamber 1 through the open window 13, in order to assure the efficient operation of the counter and to minimize the absorption and loss of the radiation energy caused by the gas in the external space of the counter chamber 1.

The magnitude and the pulse width of the pulse voltage to be applied to the electrodes strongly depend on the gas pressure in the gas plenum and the timing at which the pulse voltage is applied to the electrode, as well as on whether the counter is used as a proportional counter or a Geiger counter.

For example, when the gas is stored in the gas plenum 3 in a proportional counter according to this invention at the pressure of 1 atm., and the timing of the voltage application to the electrodes 10 and 11 is selected at a time 300 $\mu S$ after the excitation of the electromagnetic coil 7, the appropriate magnitude and pulse width of the pulse voltage to be applied to the electrodes 10 and 11 are 2 KV and 300 $\mu S$, respectively. If the counter is used as a Geiger counter, the parameters mentioned above can be chosen within much wider range.

Any gas selected from the gases used in the conventional counters such as $H_2$, $CH_4$ etc. can normally be used as a gas to be ionized for the counter of this invention, while a gas having much lower ionization potential than that of gases mentioned above can also be used for the counter of this invention which is operated in a pulse operation mode.

The repetition cycle of the gas ejection into the counter chamber strongly depends on the pumping speed of the vacuum system which evacuates the counter chamber and the vacuum space surrounding the counter and on the capacity of a power supply in the charging circuit of the capacitor for exciting the electromagnetic coil, and it is possible to choose cycles up to 10 C/S. However, in the case of choosing higher cycle rates within the cycle range mentioned above, it is necessary to provide a suitable cooling system to prevent overheating of the electromagnetic coil.

Though the counting efficiency of the counter operating in pulse operation mode according to the present invention is not so high compared with that of a conventional counter of continuous operation mode, because of the pulse operation of the counter, the S/N ratio of the counter output can b increased by a suitable statistical treatment, and the advantage resulting from the increase of S/N ratio sufficiently compensates for the disadvantage of rather low counting efficiency.

As a means to produce a gas cloud by ejecting a gas into a space between the electrodes disposed in the counter chamber, means utilizing a supersonic shock wave, or a suitable pneumatic or hydraulic means can also be used. It is also possible to use a mechanical chopper (see FIG. 2).

It will be apparent to those skilled in the art that many modificatons can be made by applying the principle of this invention to create a gas cloud in a chamber having a diaphragm-less window by ejecting a gas pulse into said chamber and to operate said chamber as a diaphram-less counter. It is intended therefore to include within the scope of this invention all modifications and embodiments which retain the spirit of this invention.

I claim:

1. A counter for measuring the intensity of energy of radioactive radiations comprising:
   a chamber provided with a diaphragm-less ray entrance window;
   two collecting electrodes disposed in said chamber and separated from each other;
   a fast acting gas valve means including means for opening said valve means only for predetermined short periods of time for intermittently ejecting a pulse of gas to be ionized into said chamber to create a gas cloud in said chamber for a short duration; and
   means for applying a pulse voltage to said electrodes during the presence of said gas cloud in the chamber in the space between said electrodes, the counter being thereby operated for the measurement of radioactive radiation of energy in a low energy region.

2. A counter according to claim 1 including a gas plenum, in which said gas valve means is at least partially located, for storing said gas.

3. A counter according to claim 5, wherein said fast-acting gas valve means includes an electromagnetic gas valve.

4. A counter according to claim 5, wherein said fast-acting gas valve means includes a mechanical chopper valve means.

5. A counter according to claim 2, wherein said electromagnetic gas valve is actuated by an electromagnetic coil connected in a discharge circuit of a capacitor.

* * * * *

PO-1050
(5/69)

UNITED STATES PATENT OFFICE
CERTIFICATE OF CORRECTION

Patent No. 3,678,274          Dated July 18, 1972

Inventor(s) Nobuki KAWASHIMA

It is certified that error appears in the above-identified patent and that said Letters Patent are hereby corrected as shown below:

Claims 3 and 4, line 1, change "5" to --1--;

Claim 5, line 1, change "2" to --3--.

Signed and sealed this 6th day of February 1973.

(SEAL)
Attest:

EDWARD M. FLETCHER, JR.        ROBERT GOTTSCHALK
Attesting Officer             Commissioner of Patents